(12) United States Patent
Garner, IV et al.

(10) Patent No.: US 11,803,416 B1
(45) Date of Patent: Oct. 31, 2023

(54) SELECTION AND MANAGEMENT OF DEVICES FOR PERFORMING TASKS WITHIN A DISTRIBUTED COMPUTING SYSTEM

(71) Applicant: Wells Fargo Bank, N.A., San Francisco, CA (US)

(72) Inventors: Andrew J. Garner, IV, State Road, NC (US); Chris Theodore Kalaboukis, San Jose, CA (US); Rameshchandra Bhaskar Ketharaju, Hyderabad (IN); Joon Maeng, Newcastle, WA (US); Ramanathan Ramanathan, Bellevue, WA (US); Abhijit Rao, Irvine, CA (US); Andres J. Saenz, Cape Coral, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 257 days.

(21) Appl. No.: 17/124,145

(22) Filed: Dec. 16, 2020

(51) Int. Cl.
*G06F 9/48* (2006.01)
*H04L 41/00* (2022.01)
*H04L 67/51* (2022.01)

(52) U.S. Cl.
CPC ............ *G06F 9/4881* (2013.01); *H04L 41/30* (2013.01); *H04L 67/51* (2022.05)

(58) Field of Classification Search
CPC ........ G06F 9/4881; H04L 41/30; H04L 67/51
See application file for complete search history.

(56) References Cited

U.S. PATENT DOCUMENTS 8,706,809 B2    4/2014   D'Amore et al.
10,438,170 B2  10/2019   Kozloski et al.
(Continued)

FOREIGN PATENT DOCUMENTS

WO    2019213372 A1    11/2019

OTHER PUBLICATIONS

Heap, "Sequential Single-Cluster Auctions for Multi-Robot Task Allocation" School of Computer Science and Engineering Faculty of Engineering, Nov. 2013, 167 pp.
(Continued)

*Primary Examiner* — Kevin T Bates
*Assistant Examiner* — Ranjan Pant
(74) *Attorney, Agent, or Firm* — Shumaker & Sieffert, P.A.

(57) ABSTRACT

An example method includes, responsive to receipt of a task request to perform a task (e.g., associated with a service), and further responsive to generation of an avatar instance from an avatar object representing at least one device having a defined group of capabilities, selecting devices (e.g., service providers providing microservices) to perform sub-tasks associated with the task, wherein each of the devices has at least one defined capability, and wherein the task request includes parameter values, and sending, to the devices, at least one sub-task request to perform the sub-tasks, the at least one sub-task request including at least one parameter value, responsive to sending the at least one sub-task request, receiving, from the devices, sub-task replies associated with performance of the sub-tasks, and sending, based on the sub-task replies, a task reply associated with performance of the task. The example method may support autonomous or semi-autonomous configurations.

27 Claims, 5 Drawing Sheets

(56) References Cited

U.S. PATENT DOCUMENTS

| | | | |
|---|---|---|---|
| 2007/0113231 A1* | 5/2007 | Honmura | G06F 9/4881 |
| | | | 718/100 |
| 2014/0208327 A1* | 7/2014 | Cadambi | G06F 9/5044 |
| | | | 718/103 |
| 2016/0335533 A1 | 11/2016 | Davis et al. | |
| 2018/0173563 A1* | 6/2018 | Hu | G06F 9/4881 |
| 2018/0262581 A1* | 9/2018 | Barton | H04L 67/60 |
| 2019/0004789 A1 | 1/2019 | Mills | |
| 2019/0098080 A1* | 3/2019 | Bermudez | H04L 67/1029 |
| 2019/0342076 A1* | 11/2019 | O'Connor | H04L 9/3239 |
| 2020/0081736 A1* | 3/2020 | Gopalan | G06F 9/5038 |
| 2021/0336776 A1* | 10/2021 | Bartolucci | H04L 63/062 |
| 2021/0374675 A1* | 12/2021 | George | G06F 11/30 |

OTHER PUBLICATIONS

Zlot et al., "Market-based Multirobot Coordination Using Task Abstraction" The 4th International Conference on Field and Service Robotics, Jul. 14-16, 2003, 6 pp.

\* cited by examiner

SELECTION AND MANAGEMENT OF DEVICES FOR PERFORMING TASKS WITHIN A DISTRIBUTED COMPUTING SYSTEM

TECHNICAL FIELD

The present disclosure relates to distributed computing systems.

BACKGROUND

In many instances, customers may use one or more computing devices to interact with servers or other systems that provide products and/or services. For example, a customer may use a computing device (e.g., smartphone, personal computer) to access a server that is configured to provide various online banking or financial products and/or services.

SUMMARY

In general, this disclosure describes techniques for selecting and managing devices within an open, distributed computing system for performing tasks (e.g., tasks associated with services and/or microservices). Within such a system, one or more centralized or distributed management systems may store avatar objects that represent devices having a defined group of capabilities to perform various tasks. In some cases, the management system may comprise a distributed ledger or a blockchain system that is capable of storing these avatar objects in an immutable form. Upon receiving task requests from client devices (e.g., devices executing applications) to perform tasks, a management system may instantiate these avatar objects to create avatar instances to perform these tasks. The avatar instances may identify devices (e.g., service providers providing microservices) within the system that each are capable of providing one or more of a defined group of capabilities and that may, in some cases, have a high trust or performance rating. After the avatar instances have identified the devices, the avatar instances may manage the performance of the tasks using the identified devices, and may then provide replies back to the client devices regarding performance of the tasks. In this way, the group of devices supporting the avatar instance for task performance may be determined dynamically, but the avatar objects and their defined capabilities may be stored by the management system and potentially remain fixed over time.

In addition, the disclosed framework may enable an open, distributed, fully autonomous and/or semi-autonomous configured network of microservices that are provided by service providers in order to perform requested services by applications executing on client devices. In some cases, the framework may enable an open, distributed, and fully autonomous network of microservices, where applications executed on client devices may post service requests that can be bid on by service providers, confirmed and executed under a configured smart contract such that, upon satisfactory completion of the performed tasks or sub-tasks associated with the microservices, and adherence to contract terms/conditions, payment is then made to the service providers. This services architecture enables economic use of microservices outside of the walls of high-level application developers. In some cases, the framework may enable a semi-autonomous configuration where a distributed open catalogue or capability marketplace provided by a management system is used to identify the microservices to be used, along with corresponding terms or conditions, in order to set up a contract that can be executed as often as needed or requested, and where payments are provided to service providers each time the contract is used or microservices are provided. In such fashion, the framework may support fully autonomous or semi-autonomous configurations with the proper controlling modules/nodes within the framework.

As one example, this disclosure is directed to a method that includes, responsive to receipt of a task request from a client device to perform a task, and further responsive to generation of an avatar instance from an avatar object that represents at least one device having a defined group of capabilities to perform the task, selecting, by the avatar instance that is executed by one or more processors, one or more devices to perform one or more sub-tasks that are associated with the task, wherein each of the one or more devices has at least one capability from the defined group of capabilities, and wherein the task request includes one or more parameter values associated with the task. The example method further includes sending, by the avatar instance and to the one or more devices, at least one sub-task request to perform the one or more sub-tasks, wherein the at least one sub-task request includes at least one parameter value from the one or more parameter values, responsive to sending the at least one sub-task request, receiving, by the avatar instance and from the one or more devices, one or more sub-task replies that are associated with performance of the one or more sub-tasks, and sending, by the avatar instance and to the client device, based on the one or more sub-task replies, a task reply that is associated with performance of the task.

As another example, this disclosure is directed to a system that includes one or more processors and a computer-readable storage device. The computer-readable storage device stores instructions that are executed by the one or more processors to: responsive to receipt of a task request from a client device to perform a task, and further responsive to generation of an avatar instance from an avatar object that represents at least one device having a defined group of capabilities to perform the task, select, by the avatar instance, one or more devices to perform one or more sub-tasks that are associated with the task, wherein each of the one or more devices has at least one capability from the defined group of capabilities, and wherein the task request includes one or more parameter values associated with the task; send, by the avatar instance and to the one or more devices, at least one sub-task request to perform the one or more sub-tasks, wherein the at least one sub-task request includes at least one parameter value from the one or more parameter values; responsive to sending the at least one sub-task request, receive, by the avatar instance and from the one or more devices, one or more sub-task replies that are associated with performance of the one or more sub-tasks; and send, by the avatar instance and to the client device, based on the one or more sub-task replies, a task reply that is associated with performance of the task.

As another example, this disclosure is directed to a computer-readable storage device storing instructions that, when executed, cause at least one or more processor of a device to: responsive to receipt of a task request from a client device to perform a task, and further responsive to generation of an avatar instance from an avatar object that represents at least one device having a defined group of capabilities to perform the task, select, by the avatar instance, one or more devices to perform one or more sub-tasks that are associated with the task, wherein each of the one or more devices has at least one capability from the defined group of capabilities, and wherein the task request includes one or more parameter values associated with the task; send, by the avatar instance and to the one or more devices, at least one sub-task request to perform the one or more sub-tasks, wherein the at least one sub-task request includes at least one parameter value from the one or more parameter values; responsive to sending the at least one sub-task request, receive, by the avatar instance and from the one or more devices, one or more sub-task replies that are associated with performance of the one or more sub-tasks; and send, by the avatar instance and to the client device, based on the one or more sub-task replies, a task reply that is associated with performance of the task.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
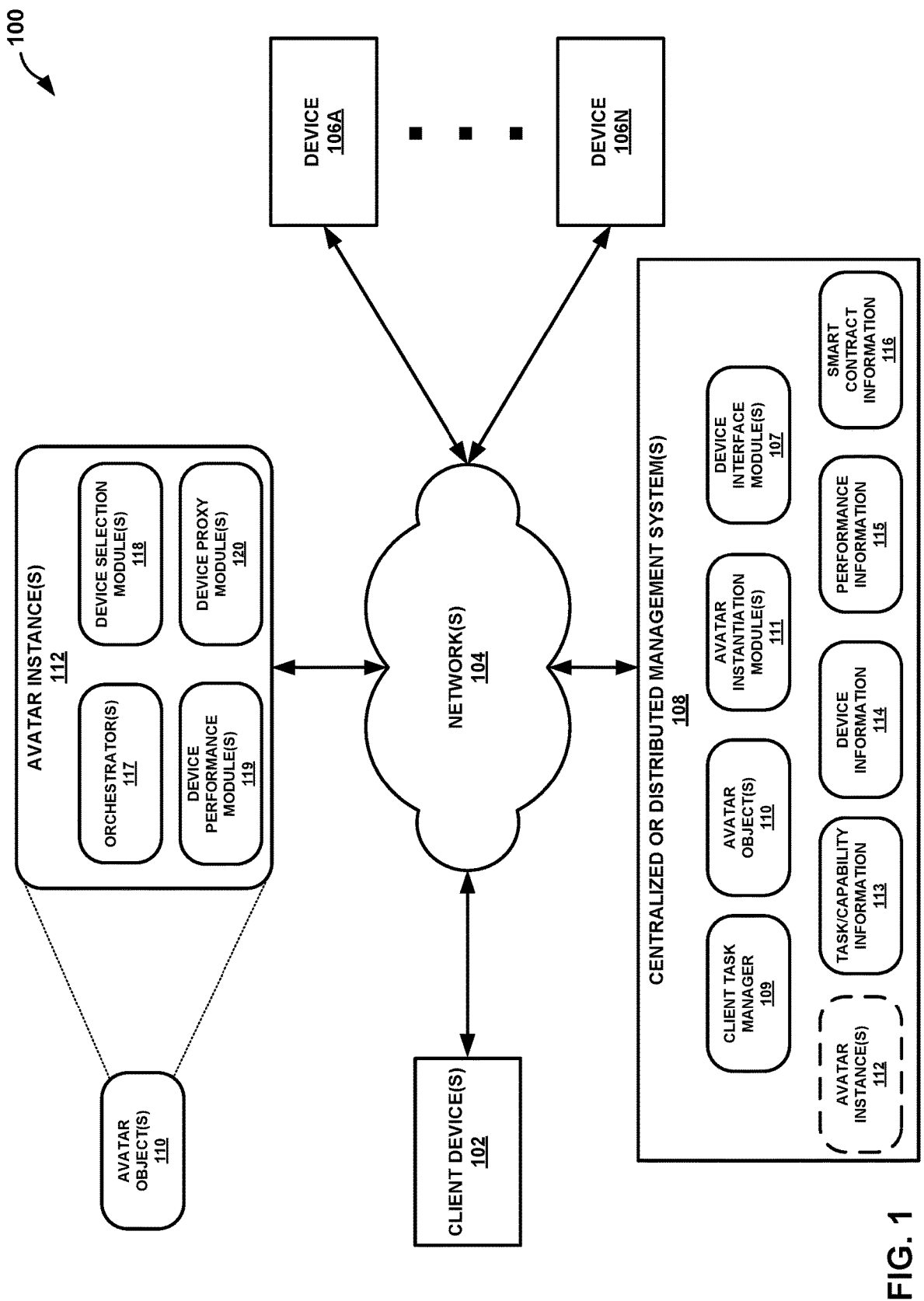
FIG. 1 is a block diagram illustrating an example distributed system that is configured to select and manage devices to perform tasks, in accordance with techniques of this disclosure.

FIG. 1 is a block diagram illustrating an example distributed system 100 that is configured to select and manage devices (e.g., machines) to perform tasks, in accordance with techniques of this disclosure. As noted above, in many instances, customers or other users may use one or more computing devices, such as one or more client devices 102 shown in FIG. 1, to interact with devices or systems that provide products and/or services, such as with one or more of devices 106A-106N (collectively, "devices 106"). Client devices 102 and/or devices 106 (e.g., one or more machines) may communicate with each other via one or more networks 104, such as one or more wireless and/or wired networks. Any given customer or user may use or be associated one or more of client devices 102.

The components illustrated in FIG. 1 may comprise one or more physical or virtual components. For instance, in various examples, a device, system, or other entity shown in FIG. 1 may comprise a physical entity or machine (e.g., a computing device, a computer server, a quantum computer, a desktop computer, a tablet computer, a laptop computer, smartphone, etc.) and/or virtual entity or machine (e.g., virtual machine, application software in a computing machine, cloud computing system, etc.). In certain examples, a device, system, or other entity may include one or more computers that process information and/or devices with embedded computers such as, e.g., smartphones, television sets, radios, wireless headsets, digital cameras, global positioning system (GPS) based navigators, automated teller machines, and so forth. Some devices conduct a single function and others carry out multiple functions.

As noted above, client devices 102 may be configured to communicate with devices 106 via one or more networks 104 within system 100, such as by sending one or more task requests to devices 106 and receiving task results upon the performance of these tasks. However, in many cases, client devices 102 may not always have information indicating which devices 106 perform which tasks or types of tasks, and client devices 102 may also in various cases have to manage the performance of certain tasks across different ones of devices 106. In some cases, while one or more of devices 106 may be configured to perform a certain task, the originally defined task may at some point become unavailable or non-performable as one or more devices 106 or their capabilities change (e.g., due to software changes or hardware failures). Further issues may arise in cases where one or more of devices 106 are virtual machines that may be created and destroyed quickly and moved between different physical devices.

According to the presently disclosed techniques, one or more centralized or distributed management systems 108 may be configured to select and manage one or more of devices 106 within system 100 for performing tasks. Management systems 108 may, in certain examples, comprise one or more centralized systems. In other examples, management systems 108 may comprise one or more distributed ledgers or blockchain systems that comprise one or more nodes, devices, servers, or other entities that are interconnected by one or more networks to form management systems 108. For purposes of illustration only, the following description of FIG. 1 will refer to one or more centralized or distributed management systems 108 simply as management system 108.

As will be described in further detail below, client devices 102 may, in various cases, send task requests to management system 108 rather than to any of devices 106 directly. As a result, client devices 102 do not necessarily have information regarding which individual ones of devices 106 perform which tasks or types of tasks. Instead, client devices 102 may send task requests to a client task manager 109 included in management system 108, and then may subsequently receive task replies back from client task manager 109 regarding the performance or status of these requests. As will also be described in more detail below, before sending one or more task requests, client devices 102 may first send a request to client task manager 109 to receive information about the types of tasks that may be supported by management system 108 using one or more of devices 106. Client task manager 109 may then provide client devices 102 information about the types of tasks that are supported and may be performed, as well as parameter information associated with these tasks. Client devices 102 may then utilize this information to determine which task requests it will subsequently send to client task manager 109.

In various examples, the disclosed framework provided by system 100 may enable an open, distributed, fully autonomous or semi-autonomous configured network of microservices that are provided by service providers (e.g., devices 106 and/or client devices 102) in order to perform requested services by applications executing on client devices 102. These applications may send requests (e.g., to client task manager 109) to perform tasks associated with these services.

In some cases, the disclosed framework may enable an open, distributed, and fully autonomous network of microservices provided by services providers (e.g., devices 106 and/or client devices 102), where applications executed on client devices 192 may post service requests (e.g., via task requests) that can be bid on by the service providers, confirmed and executed under a configured smart contract (e.g., as stored or specified by smart contract information 116), such that, upon satisfactory completion of the performed tasks or sub-tasks associated with the microservices, and adherence to contract terms/conditions, payment is then made to the service providers by management system 108. This services architecture enables economic use of microservices outside of the walls of high-level application developers.

In some cases, the framework may enable a semi-autonomous configuration where a distributed open catalogue or capability marketplace provided by management system 108 is used to identify the microservices to be used, along with corresponding terms or conditions, in order to set up a contract (e.g., as stored in smart contract information 116), which can be executed as often as needed or requested by client devices 102 and/or management system 108. Management system 108 may also issue payments to the service providers each time the contract is used and/or microservices are provided by the service providers. In such fashion, the framework of system 100 may support fully autonomous or semi-autonomous configurations with the proper controlling modules/nodes (e.g., modules/nodes provided by management system 108, avatar instances 112, and/or devices 102, 106) within the framework.

In some examples, one of client devices 102 may send a task request to client task manager 109. The task may be associated with at least one service, and the task request may be provided by an application executed on client devices 102 that requests performance of the task associated with the at least one service. Responsive to receipt of this task request from client device 102 to perform a task, client task manger 109 may pass the task request to one or more avatar instantiation modules 111. Based on the details of the task request, as well as any one or more parameter values associated with the task that are included in the task request, avatar instantiation modules 111 may select one or more avatar objects 110 for instantiation. Avatar objects 110 may each represent one or more of devices 106 and may also each have a defined group of capabilities for performing tasks. Avatar instantiation modules 111 may then instantiate these selected avatar objects 110 to create one or more corresponding avatar instances 112. In some cases, one or more of avatar instances 112 may be optionally instantiated for execution on management system 108. In some cases, one or more of avatar instances 112 may alternatively and/or additionally be instantiated for execution on one or more of devices 106 and/or client device 102.

Avatar instances 112 may, during execution, select one or more of devices 106 to perform one or more sub-tasks that are associated with the requested task, where each of the device has at least one capability from the defined group of capabilities indicated by the selected avatar objects 110. The one or more of devices 106 may be one or more service providers that are configured to provide one or more microservices associated with the at least one service for performance of the one or more sub-tasks. In some cases, avatar instances 112 may identify these devices based upon information contained in or provided by management system 108, which may serve as a capability marketplace that provides a library or catalog of existing capabilities for one or more of devices 106 and associated information (e.g., trust levels for device capabilities) associated with these devices, as will be described in further detail below. Avatar instances 112 may then select these one or more devices 106 to perform one or more sub-tasks that are associated with the requested task. Upon selection, avatar instances 112 may send, to the selected devices 106, at least one sub-task request to perform the one or more sub-tasks, where the at least one sub-task request includes at least one parameter value from the one or more parameter values. In some cases, avatar instances 112 may comprise distributed software applications supported by the group of selected devices 106.

Responsive to sending the at least one sub-task request, avatar instances 112 may receive, from the one or more devices 106, one or more sub-task replies that are associated with performance of the one or more sub-tasks. Avatar instances 112 may then send, to client device 102 based on the one or more sub-task replies, a task reply that is associated with performance of the task. In some cases, avatar instances 112 may send the task reply to client device 102 via client task manager 109. As will be described in more detail below, management system 108 may also store information regarding tasks, replies, performance data, and the like within performance information 115. Avatar instances 112 may performs operations in a fully autonomous or in a semi-autonomous manner.

Thus, according to various examples, the group of devices 106 supporting avatar instance 112 for task performance may be determined dynamically, but avatar objects 110 and their defined capabilities may be stored by management system 108 and potentially remain fixed. The disclosed techniques effectively connect the identified group of devices 106 together to create a more powerful group of devices configured to perform requested tasks based upon performance of one or more sub-tasks associated with these tasks. In some examples, devices 106 may work on different portions of requested tasks and/or sub-tasks collaboratively. In some examples, one or more of devices 106 may transfer the results of the respective portions of tasks or sub-tasks to other devices and/or avatar instances 112 for pipeline processing. As will be described more in reference to FIG. 2, avatar objects 110 may comprise one or more hierarchies or tiers of objects that collectively perform tasks and sub-tasks, in sequence and/or in parallel.

Some example use cases of tasks for which avatar instances 112 may be formed include, e.g., event tracking in which multiple different devices 106 have different sensors for monitoring a particular area, where devices 106 and avatar instances 112 may work together to identify the occurrence of a certain event (e.g., a crime). Another example use case may relate to automated decision-making or recommendation systems in which multiple different ones of devices 106 having different sensors that may monitor a user's actions over time and work together, with avatar instances 112, to determine an optimal future action for users of client device 102. Another example use case may relate to multi-factor authentication for, e.g., entry into a facility or access into a computing system, where one or more of devices 106, 102 may include one or more sensors (e.g., fingerprint sensor, camera sensor, microphone/voice sensor) for authenticating users of client device 102. These and other example use cases may be further described herein.

As shown in FIG. 1, management system 108 includes a client task manager 109, one or more avatar objects 110, one or more avatar instantiation modules 111, one or more optional avatar instances 112, task and/or capability information 113, device information 114, performance information 115, and smart contract information 116. In some examples, management system 108 may include only a subset of the components shown in FIG. 1. In some cases, one or more of avatar instances 112 may be instantiated on management system 108. In certain cases, one or more of avatar instances 112 may either alternatively or additionally be instantiated on one or more of devices 106 and/or client device 102.

Client task manager 109 may manage interactions with client device 102. For example, client task manager 109 may receive task requests provided by client device 102 and may process and/or forward these task requests to avatar instantiation modules 111. In addition, client task manager 109 may also provide information regarding devices 106 within system 100 and/or tasks and capabilities that are generally provided by one or more of devices 106. For example, client device 102 may be configured to perform certain operations but may not have information about the types of tasks that may be performed by, and/or the capabilities of, management system 108 and/or devices 106. In this case, client device 102 may send a request to client task manager 109 to obtain information about the types of tasks that may be performed, and/or the capabilities provided, by management system 108 and/or devices 106.

Client task manager 109 may then access task/capability information 113 and/or device information 114 stored in management system 108. Based on the information included in these data stores, client task manager 109 may then provide the request information back to client device 102. This requested information may include data about the types of tasks that may be performed and/or the capabilities provided by management system 108 and/or devices 106, as well as the parameters that are associated therewith. For example, in order to request performance of certain tasks or access to certain capabilities, client device 102 may provide task requests that include one or more input parameter values associated with execution of tasks. Using the information provided by client task manager 109, client device 102 may then determine which task requests and associated input parameter values to generate. Client device 102 may then send these tasks request, including the associated parameter values, to client task manager 109 in order request performance of the requested tasks. In some cases, the parameter values may relate to or specify requested functions, performance, accuracy, deliverables, ratings, reliability, dates, pricing, and/or other criteria associated with the requested task.

As described above, management system 108 stores one or more avatar objects 110. Each avatar object of avatar objects 110 may represent one or more of devices 106 and may have a defined group of capabilities for performing one or more tasks. Upon receiving a task request from client device 102, client task manager 109 may invoke or provide the task request to avatar instantiation modules 111. Avatar instantiation modules 111 may generate one or more avatar instances 112 from one or more of avatar objects 110 (e.g., by instantiating avatar objects 110 to create avatar instances 112), as indicated in FIG. 1. A lifetime of any one or more of avatar instances 112 may be from task request to task completion, at which time the respective ones of avatar instances 112 may be torn down until another similar task is requested. To ensure that each of avatar objects 110 remain the same or unchanged, the defined group of capabilities associated with a respective avatar object may be stored, e.g., in an immutable form within management system 108, such as within a blockchain or a general/distributed ledger, which does not change even if one or more of devices 106 supporting avatar instances 112 are changed.

As shown in FIG. 1, avatar instances 112 may include one or more orchestrators 117, one or more device selection modules 118, one or more device performance modules 119, and one or more device proxy modules 120. In various examples, each avatar instance of instances 112 includes a respective orchestrator, device selection module, device performance module, and one or more device proxy modules.

As noted earlier, client device 102 may include one or more input parameter values within any given task request. These parameter values may be associated with a task and may be particular variable values that are specified by client device 102 for performance of the requested task. For example, if client device 102 sends a task request to perform a multi-factor authentication task, client device 102 may include one or more parameter values in the task request associated with this requested task. For instance, the parameter values may specify particular authentication methods or certificate types that are to be used, requested authentication types or forms (e.g., fingerprint identification, facial identification, voice identification), and the like.

Avatar objects 110 stored by management system 108 may each be configured to perform any number of different tasks, and they may each provide a defined group of corresponding capabilities. As one specific example, client task manager 109 may select one of avatar objects 110 that is configured to perform such multi-factor authentication task for, e.g., entry into a facility or access into a computing system, where one or more of devices 106, 102 may include one or more sensors (e.g., fingerprint sensor, camera sensor, microphone/voice sensor) for authenticating users of client device 102. This selected avatar object 110 may have a defined group of capabilities to perform this type of task. Avatar instantiation modules 111 may generate an avatar instance 112 from this selected avatar object 110, where the generated avatar instance 112 is also configured to perform a multi-factor authentication task associated with the selected avatar object 110 based on the defined group of capabilities. Avatar instantiation modules 111 provide the input parameter values to the newly generated avatar instance 112.

In this particular example, avatar instance 112 may use device selection module 118 to identify one or more of devices 106 for performing the multi-factor authentication task. In various examples, each of the identified devices 106 may have at least one capability from the defined group of capabilities and may be configured to perform one or more sub-tasks associated with the requested multi-factor authentication task. In some cases, one or more of the identified devices may also include client device 102 (e.g., if client device 102 is requested to perform a sub-task of obtaining a facial or fingerprint image of the user, or a voice sample from the user for purposes of authentication). In certain cases, avatar instance 112 may be instantiated on or within a virtual operating system created by the identified group of devices 106. In some cases, and as will be described further in reference to FIG. 3, a hierarchy or tier of avatar instances 112 may be instantiated by avatar instantiation modules 111, where multiple avatar instances in the hierarchy may each represent one or more of devices 106, 102 and may be configured to perform a particular sub-task, and the results of certain sub-tasks may be fed as input into other sub-tasks.

In some examples, the identified group of devices 106 may be physical devices, virtual machines, and/or software running on physical devices. In some cases, proxy devices may be used for avatar instance 112 if the originally identified devices 106 are down, unavailable, or obsolete. For instance, as shown in FIG. 1, avatar instances 112 includes one or more device proxy modules 120. In a scenario in which one or more of identified devices 106 that support avatar instances 112 for task and/or sub-task performance becomes unavailable, device proxy modules 120 may serve as proxy devices for these unavailable ones of devices 106, until such time as the devices subsequently become available once again, until other ones of devices 106 having the same or similar capabilities are identified for further task and/or sub-task performance, or until task and/or sub-task performance has completed, to list a few examples. Any changes of devices 106 or device proxy modules 120 during execution of avatar instances 112 may be seamless and with no interruption of service by avatar instance.

Device selection modules 118 of avatar instances 112 may select one or more of devices 106 such that each selected device has a specific capability or job and all of the identified devices 106, when combined together, are able to perform the overall tasks assigned to avatar instances 112. Device selection modules 118 may identify particular ones of devices 106 that have existing capabilities to perform requested tasks, as well as high trust or performance ratings. For example, device selection modules 118 may select or identify devices via a capability marketplace provided by management system 108 that provides a library or catalog of existing capabilities for devices 106 in networks 104 and, in some cases, associated trust levels or ratings for the devices' capabilities.

For example, management system 108 may provide such capability marketplace functionality. As shown in FIG. 1, management system 108 may include or store task and/or capability information 113, as well as device information 114. Task/capability information 113 may include a library or catalog of existing capabilities for devices 106 in networks 104. Task/capability information 113 may also include information regarding which tasks/sub-tasks, or types of tasks/sub-tasks, are supported by devices 106. Over time, one or more of devices 106 may advertise certain capability and/or task support, and these devices 106 may request that such information be stored in task/capability information 113. In such fashion, capabilities of devices 106 may be advertised or shared with other devices within system 100. Each device may report its capabilities to one or more nodes or devices included in or associated with management system 108. In some cases, the reported capabilities may include "hard" capabilities that the device's hardware is built to perform and "soft" capabilities that may be configured in software running on the device. In other words, devices 106 may report not just what devices can do (e.g., hard capabilities), but what devices 106 may be taught or programmed to do (e.g., soft capabilities).

The information included in task/capability information 113 may be indexed or otherwise associated with the one or more devices 106 that provide such capabilities or task support. For instance, task/capability information 113 may be indexed or otherwise associated with device identifiers of corresponding devices 106, such as device identifiers provided in device information 114. In some examples, device selection modules 118 may retrieve data from task/capability information 113 and may perform its identification operations based on the retrieved data, such that each identified device has at least one of the defined group of capabilities to perform a requested task.

Device information 114 stored in management system 108 contains further data associated with devices 106. For example, device information 114 may include device identifiers, address data, current availability/bandwidth, and/or other associated metadata associated with devices 106. In some cases, device information 114 may be part of or included within task/capability information 113. In various examples, task/capability information 113 and/or device information 114 may include one or more of trustworthiness information, rating information, quality information, and/or pricing information associated with capabilities of or tasks performed by devices 106. In these examples, as devices 106 perform tasks or sub-tasks over time, other devices or systems of 104 may provide feedback associated with trustworthiness, ratings, quality, etc., associated with the services provided by these devices 106. Management system 108 may store such information within task/capability information 113 and/or device information 114. In addition, in certain cases, one or more of devices 106 may report or advertise a fee structure or a fee range for respective capabilities or tasks to management system 108, which may be stored in task/capability information 113 and/or device information 114. In some examples, the fee structure may change based on the trust level or rating associated with a device's capabilities.

Device selection modules 118 of avatar instances 112 may access task/capability information 113 and/or device information 114 to identify and select one or more of devices 16 having one or more capabilities to perform requested tasks, based on the defined group of capabilities associated with the corresponding avatar objects 110 from which avatar instances 112 were generated. If device selection modules 118 identify more than one device as having a certain existing capability, device selection modules 118 may, e.g., select one of devices 106 having a highest trust level or rating for the capability, based on information included in task/capability information 113 and/or device information 114, such as ratings associated with capabilities, trustworthiness, performance, accuracy, quality, and/or price for services provided by devices 106, to name only a few examples. In some cases, performance information 115 may also include one or more of trustworthiness information, performance information, accuracy information, rating information, quality information, current availability information, and/or pricing information for services provided by devices 106. In these cases, device selection modules 118 may retrieve data from performance information 115 and use such data to identify one or more of devices 106 to perform a task or sub-task. In some cases, device selection modules 118 may further identify one or more of devices 106 to perform a task or sub-task based on at least one parameter value from the one or more parameter values that may be included in the task request sent from client devices 102.

In some examples, device selection modules 118 may create smart contract conditions associated with performance of one or more sub-tasks by one or more of devices 106. Device selection modules 118 may store these conditions within smart contract information 116. Responsive to performance of the one or more sub-tasks by devices 106, device selection modules 118 may store performance information 115 that indicates contribution amounts of devices 106 in performing the one or more sub-tasks. Device performance modules 119 and/or device interface modules 107 may calculate, based on performance information 115 and on the smart contract conditions, payment information associated with payment to devices 106 for performing the one or more sub-tasks.

In certain examples, device selection modules 118 may further perform bidding or auction operations associated with devices 106 for performing one or more sub-tasks associated with a requested task. Device selection modules 188 may perform these operations to obtain use of each of the identified devices to support avatar instances 112 during execution, particularly in those cases in which multiple different ones of devices 106 may have one or more of the capabilities that perform identified tasks or sub-tasks. Device selection modules 118 may store the information associated with the bidding or auction operations (e.g., in device information 114 and/or smart contract information 116), and may identify one or more of devices 106 further based on this information. In some cases, based upon the bidding and/or negotiation of services with devices 106, device selection modules 118 may create or use a smart contact with one or more of the identified devices 106 that is associated with performance of tasks or sub-tasks, thereby binding these identified devices 106 to one or more smart contracts (e.g., software/code contracts, legal contracts) for performance of the specified tasks or sub-tasks. The smart contract and/or smart contract conditions may include or specify the information associated with the bidding or auction operations. Avatar instances 112 may store such smart contracts within smart contract information 118 within management system 108. Device selection modules 118 and/or orchestrators 117 of avatar instances 112 may coordinate availability and pricing with one or more of devices 106 depending on how devices 106 interact to perform the specified tasks or sub-tasks.

For the identified devices 106, pricing per capability/device may come into play based on the usage or contribution amount, as recorded in performance information 115, or the level of importance of that capability/device to the overall task or sub-task. This pricing structure may also be a factor in the bidding or auction process for the set of identified devices 106. For instance, device selection modules 118 may determine that one or more of devices 106 may be more valuable or important to an overall task or sub-task. In this instance, device selection modules 118 may bid more for these devices at a certain time. In general, the pricing may take into account both pre-task valuations (e.g., bidding amounts) and post-task valuations (e.g., contribution amounts for performed tasks or sub-tasks). Device performance modules 119 of avatar instances 112 may determine the performance of devices 106 when performing tasks or sub-tasks, and may record determined performance metrics within performance information 115 of management system 108. These determined metrics may include metrics associated with contribution amounts, demonstrated capabilities, trustworthiness, performance, accuracy, ratings, quality, and/or price for services provided by devices 106. In some cases, performance information 115 may indicate contribution amounts of one or more of the identified devices 106 in performing one or more tasks and/or sub-tasks.

In some examples, device performance modules 119 and/or device interface modules 107 may calculate, based on performance information 115 and/or information associated with bidding or auction operations, payment information associated with payment to one or more of devices 106 for performing one or more of the tasks or sub-tasks. In certain examples, the calculation of the payment information may be further based on a smart contract and/or smart contract conditions, such as included in smart contract information 116.

In some cases, device selection modules 118 may interact with one or more device interface modules 107 of management system 108. In these cases, device interface modules 107 may manage one or more portions of the onboarding process to identify devices 106 for performance of tasks or sub-tasks. Device interface modules 107 may perform bidding and/or auction operations, such as described above, and may serve as an interface between device selection modules 118 and devices 106. Devices 106 may inform device interface modules 107 of task, capability, device, and other advertised information, and device interface modules 107 may store such information within task/capability information 113, device information 114, and/or performance information 115. Device interface modules 107 may then process requests from device selection modules 118 to identify candidate devices from devices 106. Device selection modules 118 may include one or more parameter values within these requests (e.g., bidding values, task/capability values, performance values, accuracy values, cost values, quality values), and device interface modules 107 may then identify one or more devices 106 (e.g., based on interaction with devices 106, based on information included in task/capability information 113, device information 114, and/or performance information 115), in an effort to maximize one or more criteria (e.g., criteria related to capability, performance, accuracy, ratings, quality, and/or cost). Device interface modules 107 may then provide an indication (e.g., device identifiers) of the identified devices 106 back to device selection modules 118.

In some scenarios, task/capability information 113 and/or device information 114 stored in management system 108 may facilitate capability testing with one or more of devices 106 prior to selection by device selection modules 118. As one example, device selection module 118 may interact with management system 108 to obtain task/capability information 113, performance information 115, and/or device information 114 associated with one or more of devices 106. Device selection modules 118 may analyze this information to identify one or more candidate devices that may be enabled to perform certain sub-tasks. Based on this analysis, device selection modules 118 may, during a testing phase, send sample test data to one or more of these candidate devices and select one or more of devices 106 for performance of one or more sub-tasks based on the results of the processed test data, where the test data is associated with the one or more sub-tasks. In certain examples, rather than sending sample test data directly to devices 106, device selection modules 118 may request that device interface modules 107 of management system 108 perform the test process and send sample test data to these candidate devices. Device selection modules 118 and/or device interface modules 107 may then, responsive to sending the test data, receiving test response data from the one or more device 106. Responsive to determining that the test response data satisfies one or more criteria, device selection modules 118 and/or device interface modules 107 may determine that these devices are capable of performing the one or more sub-tasks, and may provide an indication of the selected devices 106.

Device interface modules 107 may, in some cases, store a list of pre-tested and/or pre-validated devices (e.g., in device information 114), along with corresponding indicators of pre-tested or pre-validated criteria (e.g., criteria associated with performance, accuracy, cost, quality, and the like). Device interface modules 107 may identify pre-validated devices by pre-validating such devices prior to receiving particular task requests from client devices 102. In these cases, rather than performing any real-time tests or validations upon receipt of selection requests from device selection modules 118, device interface modules 107 may process these selection requests by identifying devices 106 that are included in the list of pre-tested and/or pre-validated devices based on one or more criteria (e.g., criteria based on parameter values specified by device selection modules 118).

Once device selection module 118 has onboarded one or more identified devices 106, avatar instances 112 may include device proxy modules 120 for the identified devices 106. For instance, for each identified device, device proxy modules 120 may include one corresponding device proxy module. As a result, each avatar instance may comprise a distributed software application executed on a virtual operating system, representing a device entity that includes one or more device proxy modules 120 that correspond to one or more of devices 106 that perform tasks and/or sub-tasks for the respective avatar instance. In some cases, upon instantiation, avatar instances 112 may identify and change or swap its supporting devices 106 in real time. For example, avatar instances 112 may determine an issue associated with performance of a sub-task by a first device, and may identify (e.g., based on retrieved data from task/capability information 113) a second device that may perform the sub-task, where the second device has at least one capability from the defined group of capabilities. Avatar instances 112 may then send a sub-task request to the second device to perform the sub-task.

As such, avatar instances 112 may drop an initial supporting device and identify and/or add a new device (e.g., upon identifying better capabilities available in the new device, upon identifying a failure or error in the initial supporting device). In some cases, orchestrators 117 may perform the change from one device to another device based upon a real-time monitoring of identified devices 106 that support avatar instances 112. Orchestrators 117 may associate the currently identified devices 106 with device proxy modules 120 dynamically over time, such that avatar instances 112 may continuously use and interact with device proxy modules 120 for performing tasks and/or sub-tasks, regardless of which particular devices 106 support avatar instances 112 at any particular time. In certain examples, if a device included in the set of supporting devices 106 is changed, added, or removed, a virtual operating system may accommodate the new hardware/device seamlessly (e.g., for real-time, seamless recovery or failover of devices or task/sub-task performance by devices 106). Avatar instances 112 may be supported by any number of different devices 106 within system 100. In addition, any of devices 106 may support one or more different ones of avatar instances 112.

Orchestrators 117 of avatar instances 112 may, in some cases, be configured to monitor each avatar instance of avatar instances 112 and determine whether a respective avatar instance 112 is functioning as designed and, e.g., has not been hacked or altered. In some examples, orchestrators 117 may utilize a simple hash approach to make sure a determination. As noted above, each avatar instance of instances 112 may include or be associated with a respective orchestrator from orchestrators 117. In addition, in some examples, orchestrators 117 and avatar instances 112 themselves may be part of a blockchain (e.g., part of or included in management system 108). Each time an avatar instance is instantiated to perform a task, the identity of this avatar instance may be validated by the blockchain.

Orchestrators 117 may be configured to orchestrate and/or manage the execution of avatar instances 112. For example, orchestrators 117 may be configured to determine which tasks or sub-tasks are assigned to which identified devices 106 that are part of the collective device entity selected by device selection modules 118, and/or the ordering in which these tasks or sub-tasks are performed. Orchestrators 117 can, for instance, determine which sub-tasks performed by select devices can be performed in parallel and which are to be performed in a particular sequence (e.g., serially dependent upon the performance of other sub-tasks). For each sub-task, orchestrators 117 may provide one or more of devices 106 with select parameter values for performing these sub-tasks, including one or more of the parameter values input by client devices 102, and orchestrators 117 may also receive any output values provided by devices 106 upon performance of their assigned sub-tasks. For serially dependent tasks or sub-tasks, orchestrators 117 may be configured to provide one or more of the received output values associated with certain sub-tasks as input parameter values that are used for the performance of subsequent sub-tasks by one or more of devices 106. In some examples, the functions previously described by one or more of device selection modules 118, device performance modules 119, and/or device proxy modules 120 may be performed by orchestrators 117.

Responsive to orchestrators 117 sending sub-task requests to identified ones of devices 106, orchestrators 117 may receive one or more sub-task replies from these devices 106, where the sub-task replies are associated with performance of the respective sub-tasks. Based on these sub-task replies, orchestrators 117 may generate one or more task replies that is associated with performance of the one or more tasks requested by client devices 102. Orchestrators 117 may send these task replies back to client devices 102 directly or via client task manager 109 of management system 108. After the task replies have been provided to client devices 102, management system 108 (e.g., using avatar instantiation modules 111) may terminate the respective one or more of avatar instances 112 that were configured to perform the task.

In addition, the results of the task performed by avatar instances 112 may be moved to management system 108 (e.g., a blockchain) for verification and tracking purposes such that a transaction history of avatar instances 112 is maintained. For example, device performance modules 119 may track task performance results and provide such results for storage in performance information 115. In this way, although there may be several different avatar instances 112, a copy of the avatar objects 110 and data related to task performance (e.g., task results) may be stored and preserved in performance information 115.

As noted above, pricing per capability/device may come into play based on the usage or contribution amount of each device that may support avatar instances 112, or the level of importance of that capability/device to the overall task, all of which may be captured in task/capability information 113, device information 114, and/or performance information 115. Performance information 115 may, in various cases, be tracked or indexed according to device identifiers of devices 106, task/sub-tasks identifiers of tasks/sub-tasked that are performed by devices 106, capability identifiers of the capabilities of devices 106, and/or other related information. The pricing structure may also be a factor in the bidding or auction process for the set of identified devices 106. For instance, if a certain device may be more critical to the overall task or sub-task performed by one of avatar instances 112, the respective device selection module 118 of that instance, or device interface modules 107 that communicate with that instance, may bid more for that device at a certain time. In general, and as noted previously, the pricing may take into account both pre-task valuations (e.g., bidding amounts) and post-task valuations (e.g., contribution amounts), which may be reflected in performance information 115 and/or smart contract information 116.

Device performance modules 119 and/or device interface modules 107 may collect payment from customers (e.g., users of client devices 102) and pay the ones of devices 106 used to support each avatar instance in real-time or for all use within a period of time, e.g., daily, biweekly or monthly. Device performance modules may use or communicate with device interface modules 107 of management system 108 (e.g., in a blockchain) to determine the amount owed to each device during execution, or at the completion of execution, of avatar instances 112. In some examples, built-in checkpoints may be used for the tasks and/or payments based on performance metrics (e.g., accuracy, quality, timeliness, etc.) by each device at that checkpoint, as indicated in performance information 115. As one example, one or more blocks in the blockchain provided by task/capability information 113, device information 114, and/or performance information of management system 108 may include: device information with capabilities and a rating, device availability, device contribution or performance (e.g., entered every n seconds). These blocks may then, e.g., be validated by consensus depending on origin and use. This may be more than a standard blockchain consensus of confirming that transactions are recorded.

In some examples, one or more machine learning modules provided by management system 108 may include one or more an artificial intelligence (AI) or deep learning engines capable of analyzing a large volume of data to assist with the instantiation of avatar instances 112, selecting devices 106 for performing tasks/sub-tasks, calculating metric or parameter values, performing optimization processes, collecting and/or analyzing performance information 115, and the like. These machine learning modules may also be configured to continuously learn which criteria are more important, or have higher weight, based on task/capability information 113, device information 114, and/or performance information 115, and may correspondingly update respective machine learning models maintained by management systems 108.

Figure 2:
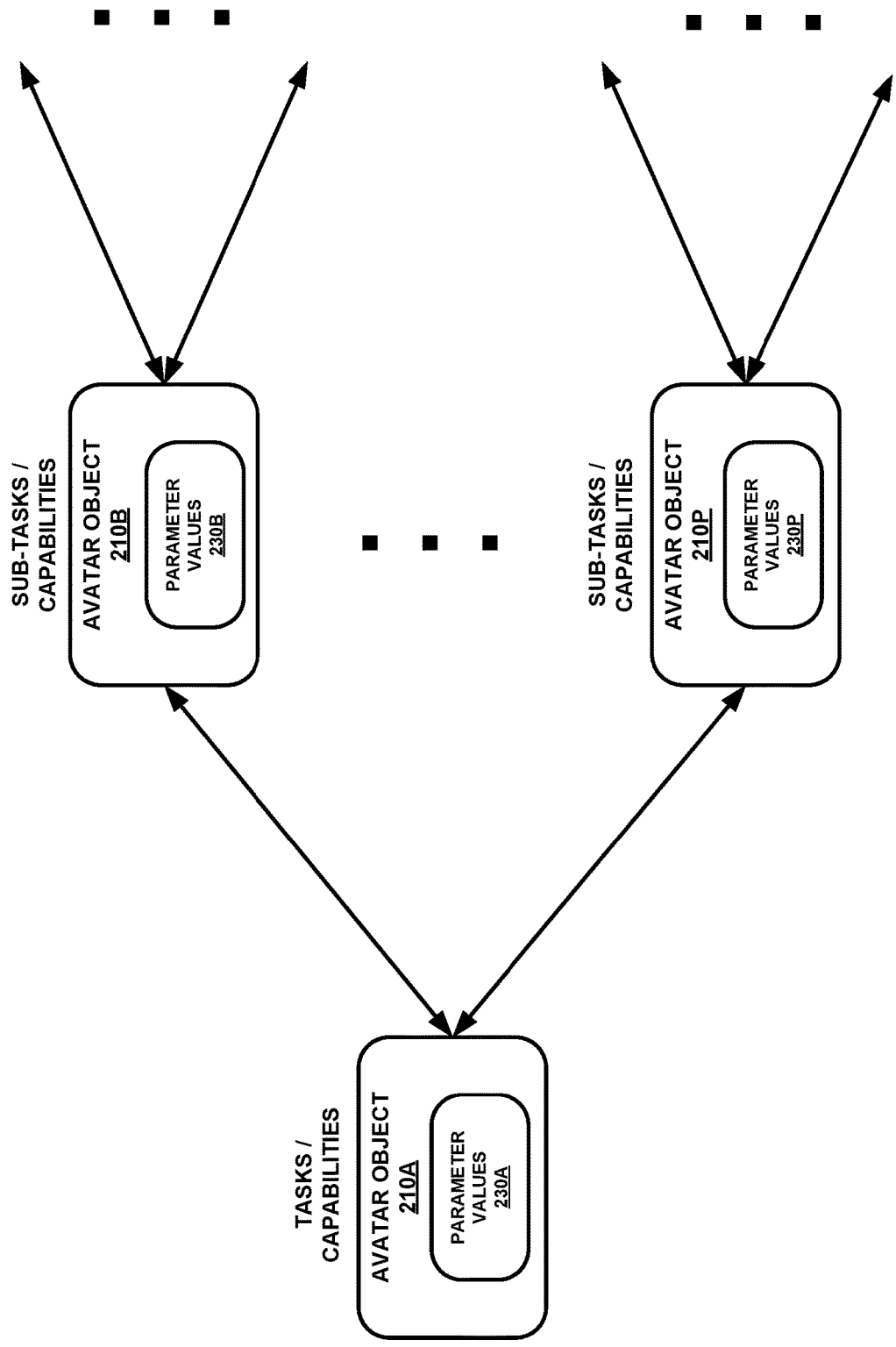
FIG. 2 is a conceptual diagram illustrating examples of avatar objects shown in FIG. 1, in accordance with techniques of this disclosure.

FIG. 2 is a conceptual diagram illustrating examples of avatar objects shown in FIG. 1, in accordance with techniques of this disclosure. In FIG. 2, avatar objects 210A-210P (collectively, "avatar objects 210") may be one example of avatar objects 110 shown in FIG. 1. Avatar objects 210 may be stored (e.g., in persistent and/or immutable form) within a management system, such as management system 108. As previously described, avatar objects may be organized in one or more tiers and/or hierarchies, such as illustrated in FIG. 2. In some examples, the depiction of avatar objects shown in FIG. 2 may comprise an object model.

For example, avatar object 210A may comprise an object positioned at a first tier or level of a hierarchy. As a result, avatar object 210A may be a highest-level object in this hierarchy. Avatar object 210A may represent a collective group of one or more devices (e.g., a device entity) that has a defined group of capabilities to perform one or more tasks.

One or more avatar objects 210B-210P may comprise objects positioned at a second tier or level of the hierarchy illustrated in FIG. 2, where each of avatar objects 210B-210P is a sub-object or child object of avatar object 210A. These avatar objects 210B-210P may be lower-level or leaf objects in this hierarchy, and they may each represent a collective sub-group of one or more devices (e.g., device entities/sub-entities) that has a defined group of capabilities to perform one or more sub-tasks associated with the tasks performed by avatar object 210A. For example, avatar object 210B may represent a first collective sub-group of one or more devices having a first defined group of capabilities to perform one or more sub-tasks associated with the tasks performed by avatar object 210A, where the first defined group of capabilities includes at least one capability provided by avatar object 210A. Similarly, avatar object 210P may represent a second collective sub-group of one or more devices having a second defined group of capabilities to perform one or more sub-tasks associated with the tasks performed by avatar object 210A, where the second defined group of capabilities includes at least one capability provided by avatar object 210A.

As indicated in FIG. 2, in some instances, one or more of avatar objects 210B-210P may have respective sub-objects or child objects positioned at further lower-level tiers or levels of the hierarchy. These further avatar objects may be further lower-level or leaf objects in the hierarchy, and they may each represent a collective sub-group of one or more devices that has a defined group of capabilities to perform one or more sub-tasks associated with the tasks performed by respective avatar objects 210B-210P.

As also shown in FIG. 2, each avatar object may include one or more parameter values for corresponding parameters of the respective avatar object. These parameter values are associated with the tasks that may be performed by the respective avatar object. For instance, avatar object 210A has one or more parameter values 230A, which are associated with the tasks that may be performed by avatar object 210A. As one example, if avatar object 210A may be defined to perform a task related to authentication or multi-factor authentication, parameter values 230A may specify particular authentication methods or certificate types that are to be used, requested authentication types or forms (e.g., fingerprint identification, facial identification, voice identification), and the like. In some cases, these parameter values 230A may have pre-configured or default values. In other cases, parameter values 230A may have null or empty values that are populated upon instantiation of avatar object 210A into an avatar instance (e.g., one of avatar instances 112 shown in FIG. 1).

Similarly, avatar object 210B has one or more parameter values 230B, which are associated with the tasks that may be performed by avatar object 210B. Avatar object 210P has one or more parameter values 230P, which are associated with the tasks that may be performed by avatar object 210P.

Figure 3:
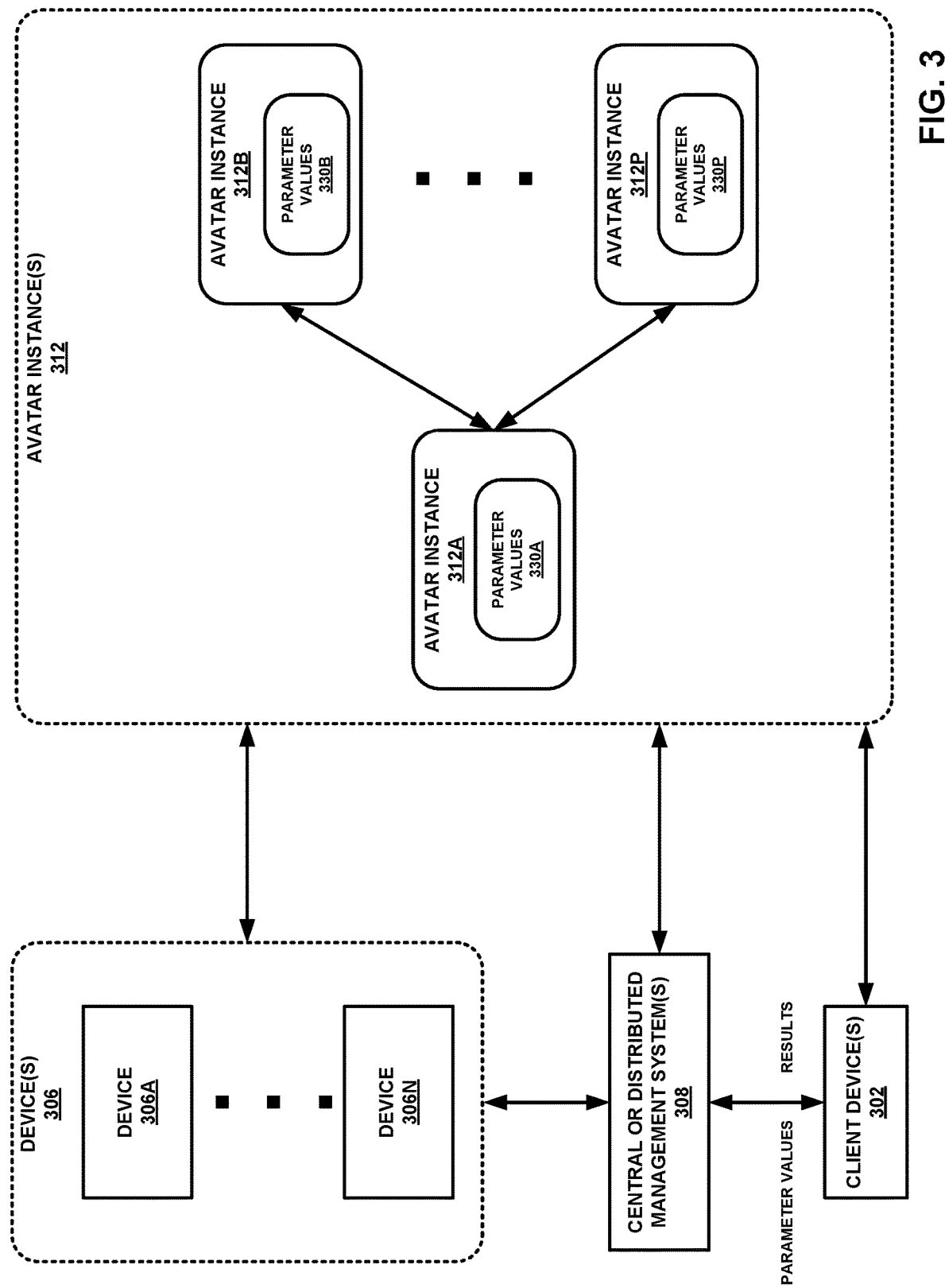
FIG. 3 is a block diagram illustrating an example of the system shown in FIG. 1 that is configured to select and manage devices to perform tasks, in accordance with techniques of this disclosure.

FIG. 3 is a block diagram illustrating an example of the system shown in FIG. 1 that is configured to select and manage devices to perform tasks, in accordance with techniques of this disclosure. Various elements shown in FIG. 3 may have functionality that is similar to elements of FIG. 1 or FIG. 2 having similar reference numbers. Thus, devices 306 may be one example of devices 106; central or distributed management systems 308 may be one example of central or distributed management systems 108; client devices 302 may be one example of client devices 102; and avatar instances 312 may be one example of avatar instances 112.

As previously above in reference to FIGS. 1 and 2, avatar objects may be organized in one or more tiers and/or hierarchies. When management system 308 instantiates these avatar objects (e.g., using avatar instantiation modules 111), these may be instantiated as avatar instances 312 shown in FIG. 3, where these avatar instances are similarly organized in one or more tiers or hierarchies, corresponding to those of their source avatar objects. FIG. 3 illustrates examples of avatar instances 312, namely avatar instances 312A and 312B-312P.

For example, avatar instance 312A may comprise an instance positioned at a first tier or level of a hierarchy. Avatar instance 312A may be created, e.g., from avatar object 210A. Avatar instance 312A may be a highest-level object in this hierarchy. Similar to avatar object 210A from FIG. 2, avatar instance in FIG. 3 may represent a collective group of one or more devices (e.g., a device entity) that has a defined group of capabilities to perform one or more tasks.

One or more avatar instances 312B-312P may comprise avatar instances positioned at a second tier or level of the hierarchy illustrated in FIG. 3, where each of avatar instances 312B-312P is a sub-object or child object of avatar instance 312A. As one example, avatar instances 312B-312P may be created from avatar objects 210B-210P shown in FIG. 2. Avatar instances 312B-312P may be lower-level or leaf objects in the hierarchy of FIG. 3, and they may each represent a collective sub-group of one or more devices (e.g., device entities/sub-entities) that has a defined group of capabilities to perform one or more sub-tasks associated with the tasks performed by avatar instance 312A.

As also shown in FIG. 3, each avatar instance may include one or more parameter values for corresponding parameters of the respective avatar instance. These parameter values are associated with the tasks that may be performed by the respective avatar instance, based on the avatar objects (e.g., as shown in FIG. 2) from which the avatar instances are created. For instance, avatar instance 312A may be created (e.g., instantiated) from avatar object 210A. Avatar instance 312A has one or more parameter values 330A, which are associated with the tasks that may be performed by avatar instance 312A. As one example or non-limiting use case, if avatar instance 312A may be defined to perform a task related to authentication or multi-factor authentication, parameter values 330A may specify particular authentication methods or certificate types that are to be used, requested authentication types or forms (e.g., fingerprint identification, facial identification, voice identification), and the like. In some cases, these parameter values 330A may have pre-configured or default values. In other cases, parameter values 330A may have values that are populated upon instantiation of avatar instance 312A (e.g., based on one or more input parameter values included in a request from client devices 302). Similar to avatar instance 312A, avatar instances 312B-312P also have respective parameter values. For instance, avatar instance 312B includes parameter values 330B, and avatar instance 312P includes parameter values 330P.

In various examples, avatar instances 312 may collectively perform tasks or sub-tasks. In order to perform a task or sub-task (e.g., based on a task request provided by client devices 102, which may include one or more parameter values), avatar instance 312 may send multiple sub-task requests to avatar instances 312B-312P. For instance, avatar instance 312A may send, to avatar instance 312B, a first sub-task request to perform a first sub-task associated with a task requested by client devices 102. Avatar instance 312B may be associated with at least a first device of devices 306, and the first sub-task request may include at least a first parameter value from the one or more parameter values included in the request sent from client devices 102. This first parameter value may be included in parameter values 330A of avatar instance 312A and also in parameter values 330B of avatar instance 312B. Avatar instance 312A may include at least this parameter value in the first sub-task request that it sends to avatar instance 312B.

In addition, avatar instance 312A may send, to avatar instance 312P, a second sub-task request to perform a second sub-task associated with the task requested by client devices 102. Avatar instance 312P may be associated with at least a second device of devices 306, and the second sub-task request may include at least a second parameter value from the one or more parameter values included in the request sent from client devices 102. This second parameter value may be included in parameter values 330A of avatar instance 312A and also in parameter values 330P of avatar instance 312P. Avatar instance 312A may include at least this parameter value in the second sub-task request that it sends to avatar instance 312P. As such, avatar instance 312A may send multiple different sub-task requests to different ones of avatar instances 312 in the hierarchy, and may include one or more of its parameter values 330A within each of these different sub-task requests.

Avatar instance 312A may then subsequently receive corresponding sub-task replies from the other avatar instances 312 to which it had previously sent sub-task requests. For example, avatar instance 312A may receive, from avatar instance 312B, a first sub-task reply associated with performance of the first sub-task, and may also receive, from avatar instance 312P, a second sub-task reply associated with performance of the second sub-task. These sub-task replies may be based on performance of the sub-task requests by the ones of devices 306 represented by avatar instances 312B and 312P. Avatar instance 312A may then send, based on these first and second sub-task replies, a task reply that is associated with performance of the task. Avatar instance 312A and/or management system 308 (e.g., using a client task manager, such as client task manager 109 shown in FIG. 1) may in some cases send this task reply back to client devices 302.

Avatar instances 312 may each be configured to perform any number of different tasks, and they may each provide a defined group of corresponding capabilities. As one specific example or non-limiting use case, based on a request from client devices 302, management system 308 may instantiate avatar instances 312 to perform multi-factor authentication tasks or sub-tasks for, e.g., entry into a facility or access into a computing system, where one or more of devices 306, 202 may include one or more sensors (e.g., fingerprint sensor, camera sensor, microphone/voice sensor) for authenticating a user of client devices 302. For instance, a particular user of one or more client devices 302 may wish to gain entry to a facility or building. In order to do so, multi-factor authentication tasks may be performed (e.g., facial recognition, voice recognition, fingerprint recognition, password, temperature sensing). The requested task from client device 302 may include one or more parameter values (e.g., values associated with the user, the requested type of access, information about the facility or building, security parameters, type of authentication, shared secret information to access information included in a blockchain, and the like).

Management system 308 may instantiate avatar instances 312 to perform tasks or sub-tasks related to the requested task from client device 302. Collectively, avatar instances 312 may perform the requested multi-factor authentication task based on the defined group of capabilities for the avatar objects that have been instantiated to create avatar instances 312. Each of avatar instances 312 may be represented by one or more or devices 306, 302, and the task results from certain avatar instances 312 may, in some cases, be fed as input into one or more other avatar instances 312 for performing sub-tasks.

In various examples, each of the identified devices 306, 302 may have at least one capability from the defined group of capabilities and may be configured to perform one or more sub-tasks associated with the requested multi-factor authentication task. In some cases, one or more of the identified devices may also include client device 302 (e.g., if client device 302 is requested to perform a sub-task of obtaining a facial or fingerprint image of the user, or a voice sample from the user for purposes of authentication). Each of avatar instances 312 may be represented by one or more or devices 306, 302, and the task results from certain avatar instances 312 may, in some cases, be fed as input into one or more other avatar instances 312 for performing sub-tasks. The orchestrators (e.g., orchestrators 117 shown in FIG. 1) of one or more of avatar instances 312 may be configured to orchestrate or manage the handling of sub-task requests to other ones of avatar instances 312, either in parallel or in sequence.

For example, to perform the multi-factor authentication task, avatar instance 312A may (e.g., using an orchestrator such as included in orchestrators 117) invoke different ones of avatar instance 312B-312P to perform multiple different sub-tasks (e.g., obtain a facial image of the user, obtain a fingerprint image of the user, obtain a scanned imaged of a card, obtain a temperature of the user, obtain an iris scan of the user's eye, obtain a user's location), which may perform different levels of authentication. Each of avatar instances 312 may be associated with a respective device (e.g., one of device 306 or 302) for performing a respective task or sub-task. In some cases, one or more of avatar instances 312B-312P that perform these sub-tasks may represent one or more of client devices 302 for performing the respective sub-task. For instance, if one of client devices 302 is a smartphone or a smartwatch worn by the user, this client device may be configured to perform sub-tasks related to obtaining a facial image or fingerprint image of the user, and providing results back to the respective avatar instance. In some cases, one or more of avatar instances 312B-312P may represent one or more other devices 306, such as devices attached to or associated with the facility or building. These devices 306 may be configured to perform one or more sub-tasks related to obtaining a facial image or fingerprint image of the user, obtaining an iris scan of the user's eye, obtaining a temperature of the user, and/or obtaining scanned imaged of a card of the user.

Avatar instances 312B-312P may be configured to provide sub-task replies back to avatar instance 312A, where these sub-task replies are associated with performance of the one or more sub-tasks. Avatar instance 312A may then send (e.g., to client devices 302 or management system 308), based on these sub-task replies, a task reply that is associated with performance of the task.

In some cases, avatar instances 312 may also provide sub-tasks replies and/or respective parameter values as input parameter values into other ones of avatar instances 312, which may be located at the same or different tiers or levels of the hierarchy. These other avatar instances may then be configured to perform subsequent sub-tasks based on these input parameter values. In such fashion, one or more of avatar instances 312 may invoke one or more other avatar instances 312 for performance of various sub-tasks, in sequence or in parallel. Avatar instances 312 may be located at particular levels or tiers of the hierarchy to perform different levels of sub-tasks (e.g., higher-level sub-tasks, lower-level sub-tasks). Avatar instance 312A may be associated with a customer engagement level or tier (e.g., to perform higher-level sub-tasks or orchestration operations), and avatar instances 312B-312P may be associated with one or more sub-levels or sub-tiers of the hierarchy.

For instance, continuing with the example above, if certain ones of avatar instances 312B-312P are configured to perform sub-tasks (e.g., sub-tasks related to obtaining a facial image or fingerprint image of the user, obtaining an iris scan of the user's eye, obtaining a temperature of the user, obtaining scanned imaged of a card of the user, obtaining a user's location), these avatar instances may provide the results of these sub-tasks as input (e.g., sub-task replies and/or input parameter values) into one or more other ones of avatar instances 312B-312P. These other avatar instances may perform one or more sub-tasks related to performing artificial intelligence routines, blockchain identity validation routines, and the like. In some cases, these avatar instances may receive, as an input parameter value, information provided by higher-level avatar instances and/or by client devices 302 (e.g., shared secret information to access information included in the blockchain).

One or more of avatar instances 312 may then compute a score (e.g., risk score) associated with the multi-factor authentication task, based on the sub-task replies or results associated with the various performed sub-tasks. For instance, higher-level avatar instance 312A may, based on sub-task replies provided by other one or more of avatar instances 312B-312P, compute an overall risk score associated with the multi-factor authentication task. If the score exceeds a defined threshold, avatar instance 312A, management system 308, and/or client devices 302 may grant the user(s) associated with client devices 302 access into a facility or building. If the score does not exceed the defined threshold, access may be denied.

In some examples, avatar instances 312 located at higher-levels of the hierarchy may be able to detect issues associated with the performance of sub-tasks by avatar instances 312 located at lower-levels of the hierarchy. For instance, if the sub-task replies or results provided by lower-level avatar instances are inconsistent or invalid (e.g., based on the nature of the replies or results versus expectations, based on the locations of devices 306 associated with the avatar instances providing the replies or results versus expectations), the higher-level avatar instances may delete or invalidate these replies or results associated with the corresponding sub-tasks. In some cases, the higher-level avatar instances may even invalidate the entire task upon receiving such replies or results, and provide a corresponding task result (e.g., to client devices 102 and/or management system 308) indicating an error or information associated with the detected issues during performance of the task or underlying sub-tasks.

Figure 4:
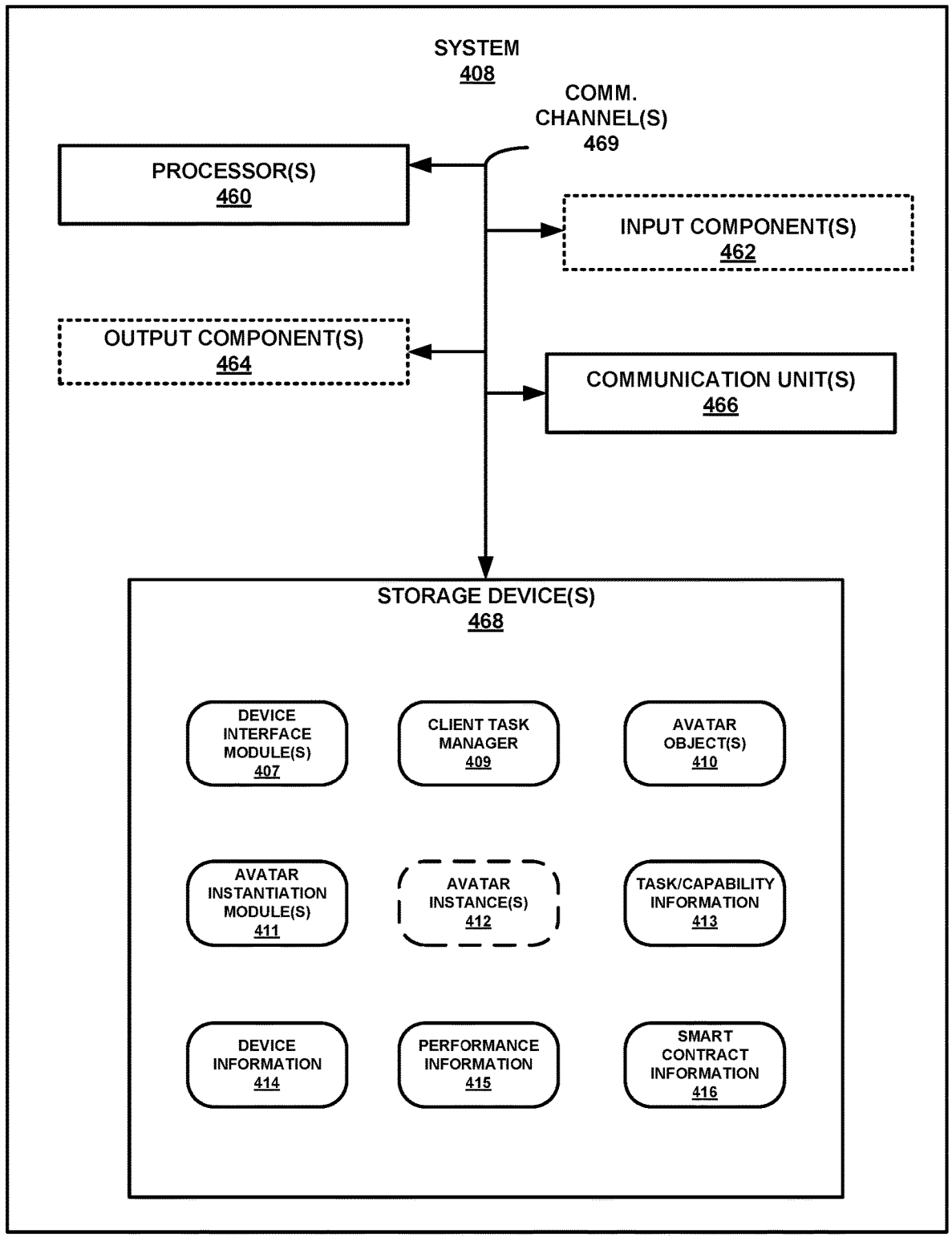
FIG. 4 is a block diagram illustrating further details of an example system, in accordance with techniques of this disclosure.

FIG. 4 is a block diagram illustrating further details of an example system 408, in accordance with techniques of this disclosure. System 408 shown in FIG. 4 may be one example of management system 108 (FIG. 1) and/or management system 308 (FIG. 3).

Management system 408 may be implemented as any suitable collection of one or more computing devices, machines, or systems, such as one or more server computers, workstations, mainframes, appliances, cloud computing systems, and/or other computing systems that may be capable of performing operations and/or functions described in accordance with one or more aspects of the present disclosure. Management system 408 may comprise a centralized or a distributed system. In some examples, system 408 may comprise one or more physical entities, while in other examples, it may comprise one or more virtual entities (e.g., virtual machines). FIG. 4 illustrates only one particular example of system 408, and many other examples of system 408 may be used in other instances and may include a subset of the components shown in, or may include additional components not shown in, FIG. 4.

As illustrated, system 408 includes one or more processors 460, one or more optional input components 462, one or more communication units 466, one or more optional output components 464, and one or more storage devices 468. Communication channels 469 may interconnect each of the components 460, 462, 464, 466, and 468 for inter-component communications (physically, communicatively, and/or operatively). In some examples, communication channels 469 may include a system bus, a network connection, an inter-process communication data structure, or any other method for communicating data between hardware and/or software.

One or more input components 462 of system 408 may receive input. Examples of input are tactile, audio, and video input. Examples of input components 462 include a presence-sensitive screen, touch-sensitive screen, mouse, keyboard, voice responsive system, video camera, microphone or any other type of device for detecting input from a human or machine.

One or more output components 464 of system 408 may generate output. Examples of output are tactile, audio, and video output. Examples of output components 464 include a presence-sensitive screen, sound card, video graphics adapter card, speaker, cathode ray tube (CRT) monitor, liquid crystal display (LCD), or any other type of device for generating output to a human or machine. Output components 464 may include display devices such as cathode ray tube (CRT) monitor, liquid crystal display (LCD), or any other type of device for generating tactile, audio, and/or visual output.

One or more communication units 466 of system 408 may communicate with one or more other devices via one or more networks by transmitting and/or receiving network signals on the one or more networks. Examples of communication units 466 include a network interface card (e.g. such as an Ethernet card), an optical transceiver, a radio frequency transceiver, or any other type of device that can send and/or receive information, such as through a wired or wireless network. Other examples of communication units 466 may include short wave radios, cellular data radios, wireless Ethernet network radios, as well as universal serial bus (USB) controllers.

One or more storage devices 468 within system 408 may store information for processing during operation of system 408 (e.g., system 408 may store data accessed by one or more modules, processes, applications, or the like during execution). In some examples, storage devices 468 on system 408 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 468 may include redundant array of independent disks (RAID) configurations and one or more solid-state drives (SSD's).

Storage devices 468, in some examples, also include one or more computer-readable storage media. Storage devices 468 may be configured to store larger amounts of information than volatile memory. Storage devices 468 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 468 may store program instructions and/or data associated with one or more software/firmware elements or modules.

For example, when system 408 comprises an example of management system 108 shown in FIG. 1, storage devices 468 may store instructions and/or data associated with device interface modules 407, client task manager 409, avatar objects 410, avatar instantiation modules 411, optional avatar instances 412, task/capability information 413, device information 414, performance information 415, and/or smart contract information 416. These may be examples of similarly named components shown in FIG. 1. In other examples, these may be examples of similarly named components of management system 308 (FIG. 3).

System 408 further includes one or more processors 460 that may implement functionality and/or execute instructions within system 408. For example, processors 460 may receive and execute instructions stored by storage devices 468 that execute the functionality of the elements and/or modules described herein. These instructions executed by processors 460 may cause system 408 to store information within storage devices 468 during program execution. Processors 460 may also execute instructions of the operating system to perform one or more operations described herein.

Figure 5:
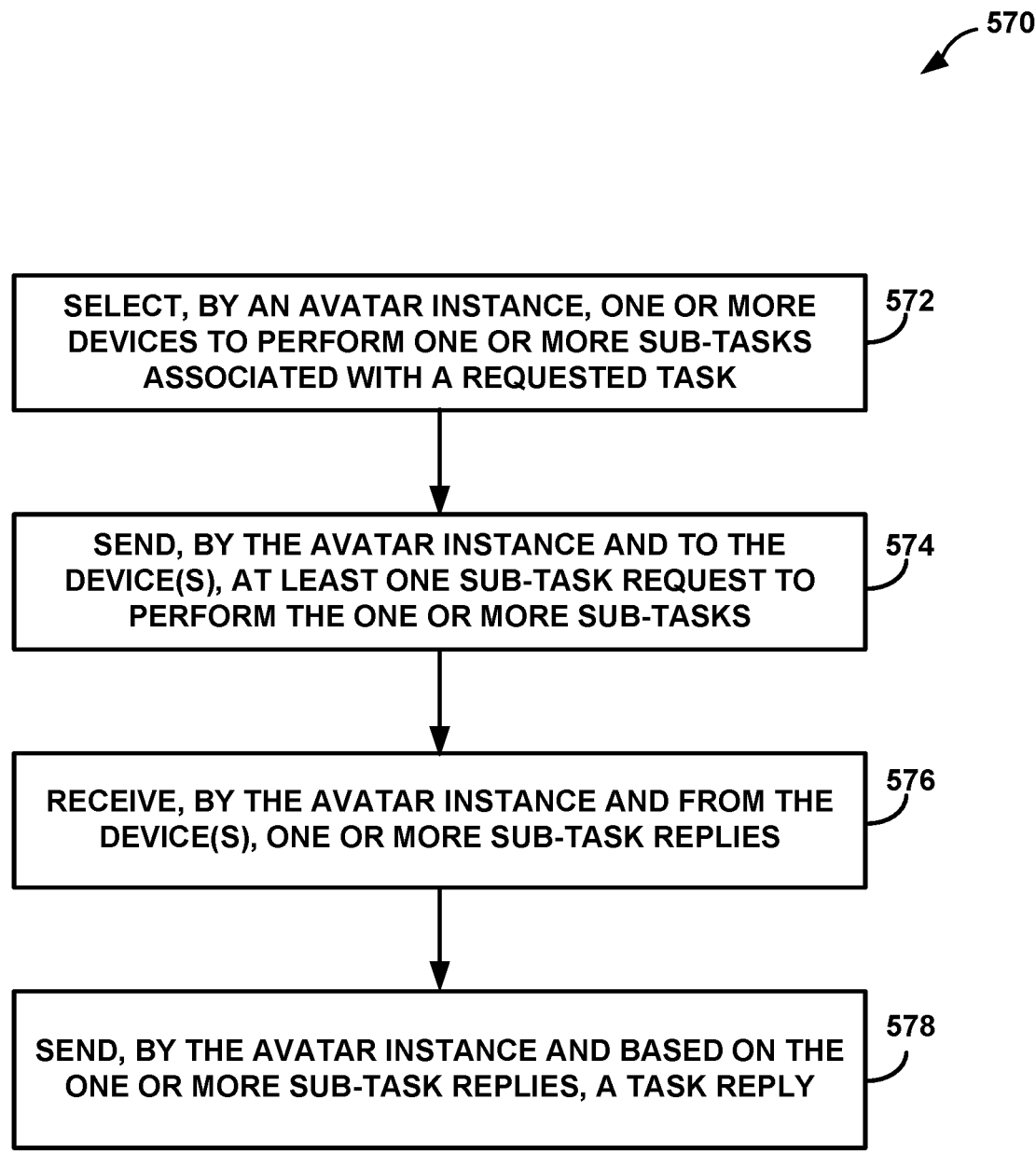
FIG. 5 is a flow diagram illustrating example operations to manage devices to perform tasks, in accordance with techniques of this disclosure.

FIG. 5 is a flow diagram illustrating example operations to manage devices to perform tasks, in accordance with techniques of this disclosure. As indicated in the example of FIG. 5, example process 570 includes operations 572, 574, 576, and 578. For purposes of illustration only, in the description of FIG. 5 below, it will be assumed that one of avatar instances 112 executed by management system 108 performs the recited operations while interacting with other entities in distributed system 100.

Responsive to client task manager 109 receiving a task request from client device 102 to perform a task, and further responsive to avatar instantiation modules 111 generating an avatar instance 112 from an avatar object 110 that represents at least one device having a defined group of capabilities to perform the task, avatar instance 112 selects (572) one or more devices 106 to perform one or more sub-tasks that are associated with the task. Each of the one or more devices 106 has at least one capability from the defined group of capabilities, and the task request includes one or more parameter values associated with the task.

Avatar instance 112 may then send (574), to the one or more devices 106, at least one sub-task request to perform the one or more sub-tasks, where the at least one sub-task request includes at least one parameter value from the one or more parameter values. Responsive to sending the at least one sub-task request, avatar instance may receive (576), from the one or more devices 106, one or more sub-task replies that are associated with performance of the one or more sub-tasks. Avatar instance 112 may then send (578), to client device 102 and based on the one or more sub-task replies, a task reply that is associated with performance of the task.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable and programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a management system, a task request from a client device to perform a task, wherein the task comprises one or more sub-tasks that define one or more functions associated with the task, and wherein the task request includes one or more parameter values specifying performance criteria for the task;
   generating, by the management system and in response to the task request, an avatar instance from an avatar object that represents at least one device having a defined group of capabilities to perform the task;
   selecting, by the avatar instance that is executed by one or more processors of the management system, one or more devices to perform the one or more sub-tasks of the task according to the performance criteria specified by the one or more parameter values, wherein selecting the one or more devices further comprises performing bidding or auction operations associated with the plurality of devices for performing at least one of the one or more sub-tasks, and wherein each of the one or more devices has at least one capability from the defined group of capabilities;
   sending, by the avatar instance and to the one or more devices, at least one sub-task request to perform the one or more sub-tasks, wherein the at least one sub-task request includes at least one parameter value from the one or more parameter values specifying performance criteria for the at least one sub-task;
   responsive to sending the at least one sub-task request, receiving, by the avatar instance and from the one or more devices, one or more sub-task replies that are associated with performance of the one or more sub-tasks;
   calculating, by the management system and based on information associated with the bidding or auction operations, payment information associated with payment to the one or more devices for performing the one or more sub-tasks; and
   sending, by the management system and to the client device, based on the one or more sub-task replies, a task reply that is associated with performance of the task.

2. The method of claim 1,
   wherein the task is associated with at least one service,
   wherein the task request is provided by an application executed on the client device that requests performance of the task associated with the at least one service,
   wherein the one or more devices comprise one or more service providers that are configured to provide one or more microservices associated with the at least one service for performance of the one or more sub-tasks, and
   wherein the avatar instance performs operations in a fully autonomous or in a semi-autonomous manner.

3. The method of claim 1, further comprising:
   responsive to receiving the task request, retrieving, by the management system, the avatar object; and
   instantiating, by the management system, the avatar object to generate the avatar instance that is executed to perform the task.

4. The method of claim 1, further comprising:
storing, by the management system and in an immutable form, the avatar object that represents the at least one device having the defined group of capabilities to perform the task, wherein the management system comprises one of a distributed ledger or a blockchain network.

5. The method of claim 1, further comprising:
retrieving, by the management system, data including at least one of task or capability information associated with a plurality of devices;
identifying, by the management system and based on the retrieved data, the one or more devices from the plurality of devices, wherein each of the one or more devices has at least one capability from the defined group of capabilities to perform the task.

6. The method of claim 5, wherein the retrieved data further includes performance information having at least one of rating information, pricing information, quality information, or current availability information that is associated with the plurality of devices.

7. The method of claim 5, wherein identifying the one or more devices comprises identifying, by the management system, the one or more devices from the plurality of devices based on the retrieved data and further based on at least one parameter value from the one or more parameter values included in the task request.

8. The method of claim 5, further comprising:
determining, by the management system, an issue associated with performance of a sub-task of the one or more sub-tasks by a first device of the one or more devices;
identifying, by the management system and based on the retrieved data that includes at least one of the task or capability information, a second device included in the plurality of devices to perform the sub-task, wherein the second device has at least one capability from the defined group of capabilities; and
sending, by the management system and to the second device, a sub-task request to perform the sub-task.

9. The method of claim 1, further comprising:
creating, by the management system, smart contract conditions associated with performance of the one or more sub-tasks by the one or more devices;
responsive to performance of the one or more sub-tasks by the one or more devices, storing, by the management system, performance information that indicates contribution amounts of the one or more devices in performing the one or more sub-tasks; and
wherein calculating the payment information further comprises calculating, by the management system and based on the performance information and the smart contract conditions, the payment information associated with payment to the one or more devices for performing the one or more sub-tasks.

10. The method of claim 9,
wherein the smart contract conditions specify the information associated with the bidding or auction operations.

11. The method of claim 1, further comprising:
storing, by the management system, information associated with the bidding or auction operations;
responsive to performance of the one or more sub-tasks by the one or more devices, storing, by the management system, performance information that indicates contribution amounts of the one or more devices in performing the one or more sub-tasks; and
wherein calculating the payment information further comprises calculating, by the management system and based on the performance information and the information associated with the bidding or auction operations, the payment information associated with payment to the one or more devices for performing the one or more sub-tasks.

12. The method of claim 1, further comprising:
sending, by the management system and during a testing phase, test data to the plurality of devices, wherein the test data is associated with the one or more sub-tasks;
responsive to sending the test data, receiving, by the management system and from the one or more devices, test response data; and
responsive to determining that the test response data satisfies one or more criteria, determining, by the management system, that the one or more devices are capable of performing the one or more sub-tasks.

13. The method of claim 12, wherein determining that the one or more devices are capable of performing the one or more sub-tasks comprises pre-validating, by the management system, the one or more devices prior to receipt of the task request.

14. The method of claim 1, wherein selecting the one or more devices comprises:
identifying, by the avatar instance, the one or more devices that each has at least one capability from the defined group of capabilities; and
responsive to the identifying, selecting the one or more devices to perform the one or more sub-tasks associated with the task.

15. The method of claim 1,
wherein the avatar instance comprises a first avatar instance,
wherein sending the at least one sub-task request comprises:
sending, by the first avatar instance and to a second avatar instance associated with at least a first device of the one or more devices, a first sub-task request to perform a first sub-task associated with the task, wherein the first sub-task request includes at least a first parameter value from the one or more parameter values; and
sending, by the first avatar instance and to a third avatar instance associated with at least a second device of the one or more devices, a second sub-task request to perform a second sub-task associated with the task, wherein the second sub-task request includes at least a second parameter value from the one or more parameter values; and
wherein receiving the one or more sub-task replies comprises:
receiving, by the first avatar instance and from the second avatar instance, a first sub-task reply associated with performance of the first sub-task; and
receiving, by the first avatar instance and from the third avatar instance, a second sub-task reply associated with performance of the second sub-task.

16. The method of claim 1,
wherein the at least one sub-task request comprises a plurality of sub-task requests, and
wherein sending the at least one sub-task request comprises sending, by the avatar instance and to the one or more devices either in parallel or in sequence, the plurality of sub-task requests.

17. A system comprising:
one or more processors; and
at least one computer-readable storage device storing instructions that are executable by the one or more processors to:
receive a task request from a client device to perform a task, wherein the task comprises one or more sub-tasks that define one or more functions associated with the task, and wherein the task request includes one or more parameter values specifying performance criteria for the task;
generate, in response to the task request, an avatar instance from an avatar object that represents at least one device having a defined group of capabilities to perform the task;
select, by the avatar instance, one or more devices to perform the one or more sub-tasks of the task according to the performance criteria specified by the one or more parameter values, wherein to select the one or more devices, the instructions are further executable by the one or more processors to perform bidding or auction operations associated with the plurality of devices for performing at least one of the one or more sub-tasks, and wherein each of the one or more devices has at least one capability from the defined group of capabilities;
send, by the avatar instance and to the one or more devices, at least one sub-task request to perform the one or more sub-tasks, wherein the at least one sub-task request includes at least one parameter value from the one or more parameter values specifying performance criteria for the at least one sub-task;
responsive to sending the at least one sub-task request, receive, by the avatar instance and from the one or more devices, one or more sub-task replies that are associated with performance of the one or more sub-tasks;
calculate, based on information associated with the bidding or auction operations, payment information associated with payment to the one or more devices for performing the one or more sub-tasks; and
send, to the client device, based on the one or more sub-task replies, a task reply that is associated with performance of the task.

18. The system of claim 17,
wherein the task is associated with at least one service,
wherein the task request is provided by an application executed on the client device that requests performance of the task associated with the at least one service,
wherein the one or more devices comprise one or more service providers that are configured to provide one or more microservices associated with the at least one service for performance of the one or more sub-tasks, and
wherein the avatar instance performs operations in a fully autonomous or in a semi-autonomous manner.

19. The system of claim 17, wherein the instructions stored by the at least one computer-readable storage device are further executable by the one or more processors to:
responsive to receiving the task request, retrieve the avatar object; and
instantiate the avatar object to generate the avatar instance that is executed to perform the task.

20. The system of claim 17, wherein the instructions stored by the at least one computer-readable storage device are further executable by the one or more processors to:
retrieve data including at least one of task or capability information associated with a plurality of devices;
identify, based on the retrieved data, the one or more devices from the plurality of devices, wherein each of the one or more devices has at least one capability from the defined group of capabilities to perform the task.

21. The system of claim 20, wherein the instructions stored by the at least one computer-readable storage device that are executable by the one or more processors to identify the one or more devices are further executable by the one or more processors to identify the one or more devices from the plurality of devices based on the retrieved data and further based on at least one parameter value from the one or more parameter values included in the task request.

22. The system of claim 20, wherein the instructions stored by the at least one computer-readable storage device are further executable by the one or more processors to:
determine an issue associated with performance of a sub-task of the one or more sub-tasks by a first device of the one or more devices;
identify, based on the retrieved data that includes at least one of the task or capability information, a second device included in the plurality of devices to perform the sub-task, wherein the second device has at least one capability from the defined group of capabilities; and
send, to the second device, a sub-task request to perform the sub-task.

23. The system of claim 17, wherein the instructions stored by the at least one computer-readable storage device are further executable by the one or more processors to:
create smart contract conditions associated with performance of the one or more sub-tasks by the one or more devices;
responsive to performance of the one or more sub-tasks by the one or more devices, store performance information that indicates contribution amounts of the one or more devices in performing the one or more sub-tasks; and
calculate, based on the performance information and the smart contract conditions, payment information associated with payment to the one or more devices for performing the one or more sub-tasks, wherein the smart contract conditions specify the information associated with the bidding or auction operations.

24. The system of claim 17, wherein the instructions stored by the at least one computer-readable storage device are further executable by the one or more processors to:
store information associated with the bidding or auction operations;
responsive to performance of the one or more sub-tasks by the one or more devices, store performance information that indicates contribution amounts of the one or more devices in performing the one or more sub-tasks; and
calculate, based on the performance information and the information associated with the bidding or auction operations, the payment information associated with payment to the one or devices for performing the one or more sub-tasks.

25. The system of claim 17, wherein the instructions stored by the at least one computer-readable storage device are further executable by the one or more processors to:

send, during a testing phase, test data to the plurality of devices, wherein the test data is associated with the one or more sub-tasks;
responsive to sending the test data, receive, from the one or more devices, test response data; and
responsive to determining that the test response data satisfies one or more criteria, determine that the one or more devices are capable of performing the one or more sub-tasks.

26. The system of claim 17,
wherein the at least one sub-task request comprises a plurality of sub-task requests,
wherein the instructions stored by the at least one computer-readable storage device that are executable by the one or more processors to send the at least one sub-task request are further executable by the one or more processors to send, by the avatar instance and to the one or more devices either in parallel or in sequence, the plurality of sub-task requests, and
wherein the system comprises one of a distributed ledger or a blockchain network.

27. A computer-readable storage device storing instructions that, when executed, cause at least one processor to:
receive, by a management system a task request from a client device to perform a task, wherein the task comprises one or more sub-tasks that define one or more functions associated with the task, and wherein the task request includes one or more parameter values specifying performance criteria for the task;
generate, by the management system and in response to the task request, an avatar instance from an avatar object that represents at least one device having a defined group of capabilities to perform the task;
select, by the avatar instance, one or more devices to perform the one or more sub-tasks of the task according to the performance criteria specified by the one or more parameter values, wherein to select the one or more devices, the instructions further cause the at least one processor to perform bidding or auction operations associated with the plurality of devices for performing at least one of the one or more sub-tasks, wherein each of the one or more devices has at least one capability from the defined group of capabilities;
send, by the avatar instance and to the one or more devices, at least one sub-task request to perform the one or more sub-tasks, wherein the at least one sub-task request includes at least one parameter value from the one or more parameter values specifying performance criteria for the at least one sub-task;
responsive to sending the at least one sub-task request, receive, by the avatar instance and from the one or more devices, one or more sub-task replies that are associated with performance of the one or more sub-tasks;
calculate, based on information associated with the bidding or auction operations, payment information associated with payment to the one or more devices for performing the one or more sub-tasks; and
send, by the management system and to the client device, based on the one or more sub-task replies, a task reply that is associated with performance of the task.

* * * * *